United States Patent [19]

Moerke

[11] 4,210,796

[45] Jul. 1, 1980

[54] UTILITIES SUPPLY STATION FOR WELDING GUN

[76] Inventor: Delford A. Moerke, 1020 Shady Oak Dr., North Mankato, Minn. 56001

[21] Appl. No.: 908,914

[22] Filed: May 24, 1978

[51] Int. Cl.² .......................... B23K 9/32; H01R 3/04
[52] U.S. Cl. .......................... 219/137.63; 219/137.9; 339/15
[58] Field of Search ............ 219/137.9, 137.63, 137.2; 174/15 WF; 339/15, 16 RC, 16 R, 16 C, 112 R, 112 L

[56] References Cited

U.S. PATENT DOCUMENTS

| | | | |
|---|---|---|---|
| 3,496,328 | 2/1970 | Moerke | 219/74 X |
| 3,496,338 | 2/1970 | Poitras et al. | 219/494 |
| 3,775,584 | 11/1973 | Moerke | 219/137.63 |
| 3,847,287 | 11/1974 | Dinse | 219/137.63 |
| 4,049,943 | 9/1977 | Pratt | 219/137.63 X |

*Primary Examiner*—Roy N. Envall, Jr.
*Assistant Examiner*—Keith E. George
*Attorney, Agent, or Firm*—George F. Lee

[57] ABSTRACT

The utility hoses of a welding gun are connected to the inner body of an insulative-sleeve enclosed utility station through which a consumable electrode feeds to the gun. The inner body establishes communication of the gun hoses with sources for said utilities and utilizes couplers which quickly connect and disconnect both the gun hoses from the station and the station from the supply sources for the utilities required by the gun.

9 Claims, 6 Drawing Figures

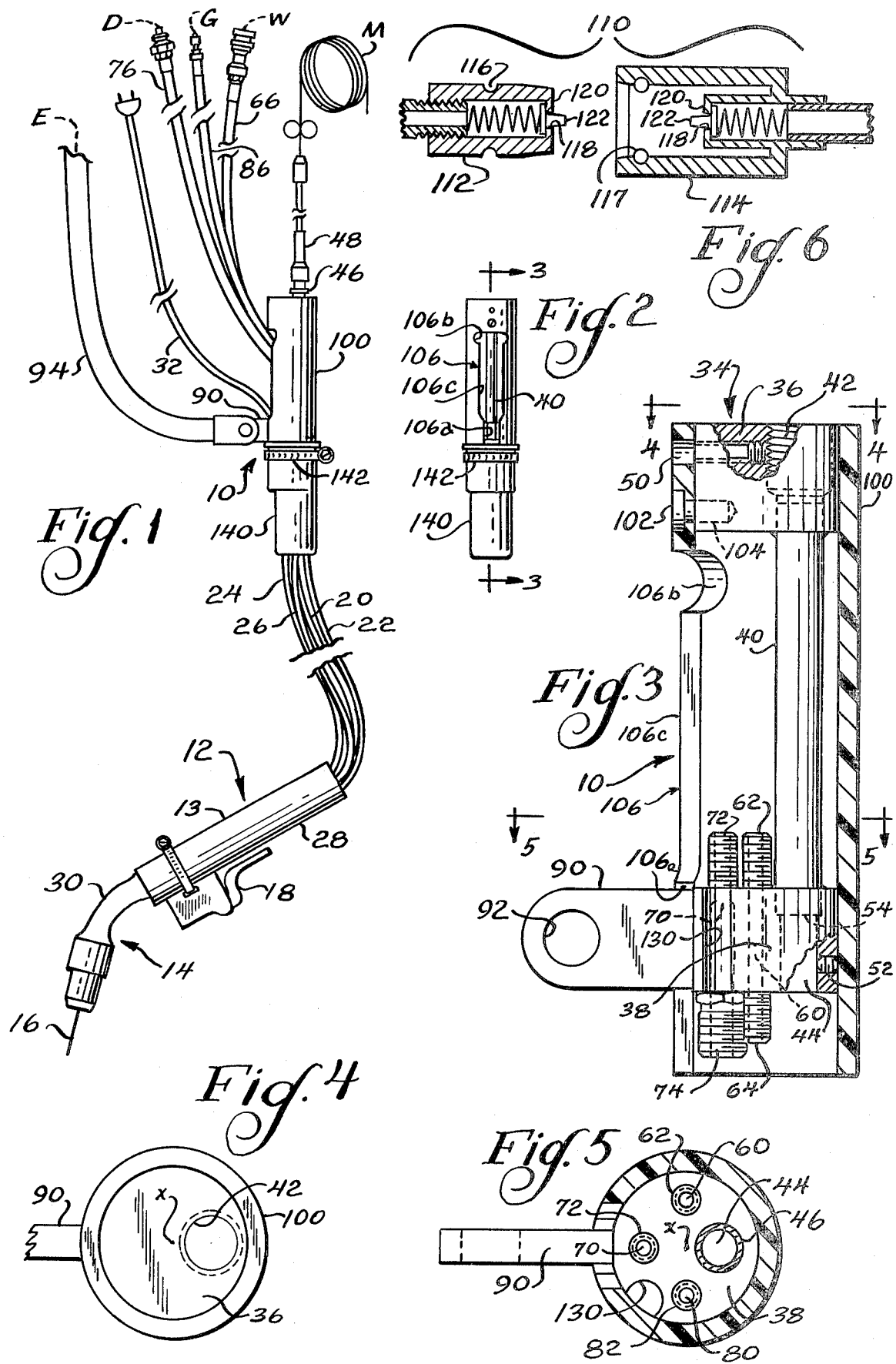

UTILITIES SUPPLY STATION FOR WELDING GUN

This invention relates to welding guns and more particularly to a novel station which may be located overhead above the working area to service the welding gun with utilities which it requires for operation such as water for nozzle cooling, gas for shielding the welding arc, and electricity both to operate the controls for the gun and also to effect the welding act itself.

In the past, the welder and his gun were trailed by long electrical lines and gas and water hoses which were required to service his gun with utilities as aforedescribed. These were not only in the way and inconvenient to the operator, hampering his operation when using the gun, but also introduced complications and delay e.g. when it was necessary to inactivate his gun for repairs, replacement or other maintenance.

A feature of this invention is that all the essential utilities including water, gas and electricity are collected in a common station through which the consumable electrode is fed to the welding gun.

In accordance with the invention, this station is portable and may be supported overhead on a fixed or adjustable (either vertically and/or horizontally) boom or other overhead structure. The station, however, also may be located on the floor or in any other area or level convenient to the welding operation.

The station includes an inner body which is connected to the gun by hoses and/or other conduits through which the utilities and consumable wire electrode are channeled to the gun; and these need be of a length only sufficient to accomodate the welding act. The station in turn is connected via short length hoses and other conduits to supply sources of said utilities. The inner body and its said connections are shielded by a protective sheath and boot which are readily dismounted from the inner body.

A feature of the invention is that both the terminals of the hoses which connect the gun to the station and the short length hose which connect the station to the utility supply sources utilize quick connect-disconnect couplers.

Another feature is that the couplers comprise spring-biased normally closed valves which open when the gun hoses are coupled to the station and or the short length hoses are connected to the supply sources. In the case of the couplers which connect the water inlet and drainage hose to the station, both halves of the couplers include normally closed valves so that both the water supply is cut off and the gun does not leak water when separated from the station.

A further feature is that the inner body of the station and its protective shield and boot are so constructed that said station may be coupled and uncoupled from the gun and/or supply sources in a compact yet simple, convenient and accessible manner.

Other objects, advantages and features of the invention will be at once apparent or will become so upon consideration of a preferred embodiment of the invention which now will be described.

Referring now to the several views of the drawing which illustrate said embodiment and in which like elements are identified by like reference numerals:

FIG. 1 illustrates the invention in a utilities supplying station for a welding gun, the gun being shown connected thereto;

FIG. 2 is a view taken in a side elevation of the utility station but turned 90° from its showing in FIG. 1 (the utility supply hoses and electrical conductors as well as the welding gun hoses and conductors being omitted) and illustrates the access slot in the sidewall of the outer sheath through which the supply hoses extend and shows the boot which is releasably clamped to the lower end of the station to enclose the electrical conductor and hose connections to the gun;

FIG. 3 is a vertical sectional view taken of the station along line 3—3 of FIG. 2 looking in the direction indicated by the arrows;

FIG. 4 is a view taken of the upper end of the station as from line 4—4 and looking in the direction of the arrows in FIG. 3;

FIG. 5 is a sectional view taken through the station along line 5—5 looking in the direction indicated by the arrows;

FIG. 6 is a fragmented somewhat diagramatic view of a quick-connect-disconnect coupler which is utilized in this invention to establish detachable communciation of the gun utility hoses to the station and in turn the station to the supply sources for said utilities.

Referring now more particularly to said views, the illustrated embodiment of the utility station according to this invention is indicated generally by 10 and in FIG. 1 is shown connecting a MIG welding gun 12 of known construction to utilities such as electricity, gas, and water identified at E, G and W. Such a gun 12 may be of any suitable construction. For example, it may be constructed as described in the inventor's U.S. Pat. No 3,496,328 his U.S. Pat. No. 3,775,584 or in his pending application Ser. No. 821,743 filed Aug. 4, 1977 now U.S. Pat. No. 4,158,763. Reference may be had to said patents and application for a more complete discription of the utility and operation of such welding guns.

For purposes of our understanding of the present invention it should suffice to understand that welding gun 12 includes a handle portion 13 having a forwardly extending water-cooled nozzle 14 through which the consumable wire metal electrode M is fed to its current tip 16. The current tip of the gun is electrically connected to one side of a power source E as when switch 18 is closed so as to develop an arc across the work, the latter being connected to the opposite side of said power source. As is conventional the consumable metal wire electrode enters the handle through the rear end thereof and is directed by a passage way to and out the current tip 16. About nozzle 14 of the gun are chambers through which water flows for which purpose the gun is provided with a water inlet hose 22 and a water outlet drainage hose 24. Conventionaly also, the welding gun is fed inert gas through a hose 26 which directs the gas into the gun for discharge about the outer end of its current tip for shielding the welding arc in the use of the gun. As is conventional, the wall of the water drainage hose 24 contains an electrical power conductor which leads from one side of a conventional arc welding power source and connects to the metal of the gun so that the current tip and electrode are live when the switch 18 is closed. The metal parts of the gun thus are a part of the welding circuit but are insulated from the electrode passage and also from the exterior of the gun as by housing 28 which is of insulating material and the nozzle-enclosing sheath 30. Conventionally, in such a gun, switch 18 will be connected into a control circuit which is connected to a second power source and energized by the operator's closing of the switch to effect not only the welding act, that is, the arc across the work, but also to feed the wire electrode through the casing from its supply source as it opens a valve which allows discharge of gas from the source through the gun and about the current tip 16. Casing 20 through which the consumable electrode feeds into the gun, the water inlet hose 22, the water drainage hose 24 and the gas inlet hose 26 enter the gun through the rear of its handle 13 or housing 28 as illustrated in FIG. 1.

In accordance with this invention said gas and water supply hoses as well as water drainage hose and both the electrical connector lines which supply the welding voltage of the control circuit are collected in a bundle which may be optionally enclosed in a sheath and directed to the utility station 10.

As aforementioned said utility station 10 may be suspended from an overhead boom or otherwise located close by the operator's working area. Although not essential to the invention, it is contemplated that the utility supply station will be detachably mounted in a fixed location relative to the work area so that the gas hose, water hose and drainage hoses as well as the electric cables or conductors comprising the switch circuit need be only of a minimal length. In practice, it has been found that from 10 to 15 feet is a practical useful length for such lines and hoses.

Considering now FIG. 3 with FIG. 1, the utility supply station 10 providing the needs of the described welding gun 12 comprises an inner body assembly 34 surrounded by a sheath 100 of heat and electrical resistant material. Said inner body assembly includes a pair of axially spaced aligned concentrically-arranged upper and lower cylindrical end blocks 36, 38 which are of constant diameter, short axial length and separated by an intermediately disposed tube 40 which is fixed to said upper and lower blocks in provided ports as by low temperature braising to form a rigid structure. In the outer surface of said upper and lower blocks 36, 38 are sockets 42, 44 of larger diameter which communicate with the opposed ends of tube 40 fixed in said ports. As illustrated by FIGS. 3, 4 and 5, said sockets 42, 44 and the communicating tube 40 are located parallel to axis x of the station inner body 34 but offset from said axis for reasons hereinafter made clear.

As shown in FIG. 3, socket 42 is internally threaded to receive the externally threaded end of an adapter 46 (FIG. 1) provided the casing 48 in which the consumable wire metal electrode feeds from its supply source M through station 10. The threaded connection of adapter 46 of the wire electrode casing 48 may be fixed by tightening set screw 50 thereagainst. Socket 44 in the lower end block snugly receives a similar adapter on the end of the gun wire electrode receiving casing 20 which feeds the consumable electrode from the station to the gun 12. Said adapter is provided with an annular groove which aligns with set screw 52 in lower end block 38 when the adapter is bottomed against ledge 54 of said socket 44 so the the wire electrode of the gun is removably fixed in said socket 44 to receive the wire electrode from reel M and direct it through the inner body 34 of the station to to the gun 12.

As seen best in FIG. 5 the axial offset location of sockets 42, 44 and communicating tube 40 provides maximum areal space within the confines of sheath 100 between its endblocks 38, 40 for location of ports 60, 70 and 80 to which short length hoses 66, 76 and 86 connect for passage of gas and water from their sources of supply G and W through station 10 to the gun 12 as well as return of water from the gun to drainage area D as now will be explained.

As will be clear from a comparison of FIGS. 3 and 5 each of said ports 60, 70 and 80 in the lower end block of 38 of the station 10 has an externally threaded fixture in the upper end thereof as illustrated at 62, 72 and 82 (the first two fixtures 62, 72 being visible in FIGS. 3 and 5 and fixture 82 being visible only in FIG. 3). Said lower end block 38 is also provided with externally threaded fixtures 64, 74, 84 which are fixed in the lower ends of said respective ports, only fixture 64, 74 of port 60 and 70 being visible in FIG. 3, and none in FIG. 5.

The lower fixtures in ports 60, 70 and 80 provide means to which quick connect-disconnect couplers fixed to the ends of the utility hoses of the cooling guns provide means for releasable connection of gun hoses 22, 24 and 26 to the station 10. Fixtures 62, 72, 82 in the upper ends of said ports 60, 70, and 80 provide means to which short length hoses 66, 76, 86 from the utility supply sources connect to the station 10 and through ports 60, 70, 80 to said welding gun hoses 22, 24 and 26 to satisfy the requirements of the welding gun 12. Thus water inlet hose 22 of the welding gun establishes communication with the water supply W through port 60 in the lower block 38 of the station 10 and water inlet hose 66 leading to the water supply W. In similar fashion, gas hose 26 of the gun communicates through port 80 in said lower end block 38 to gas supply hose 86 which connects with gas supply G; and the water outlet or drainage hose 24 of the gun connects to drainage D through port 70 and its connected hose 76.

FIG. 6 illustrates typical quick connect-disconnect couplers by which the water and gas hoses 22, 26 as well as the water drainage hose 24 from the gun 12 are detachably connected to the station 10. Similar couplers are also utilized to detachably connect the supply hoses 66, 76 and 86 of the supply station 10 to the sources of supply G, and W drainage D . As illustrated by FIG. 6, said couplers 110 comprise a first half 112 which for example threadedly connects to terminals 64, 74 and 84 on the underside of the lower end block 38 to which the gun utility hoses 22, 24 and 26 connect. A second coupler half which is fixed to said gun hoses and detachably connects to the first coupler half is illustrated at 114. As illustrated in FIG. 6 coupler half 112 includes an annular groove 116 on an exterior wall located so as to receive springbiased detents 117 spaced about the inner wall of the second coupler half 114 when the first half 112 is fully received within the second half 114 and thus releasably lock the two coupler halfs 112, 114 together. Each of said coupler halfs 112, 114 contain a spring biased valve 118 operating through a valve seat 120, the valve closure 118 being normally closed as illustrated in said FIG. 6. Each said closure valves however, also includes an engageable portion 122 which engage when the two coupler halfs 112, 114 are connected, each said valves 18 being depressed inwardly of their respective seats 120. Such an arrangement is particularly useful when utilized in the water inlet and water drainage hoses to prevent escape of water both from the welding gun as when separated from the station and simultaneously to shut off the supply of water. Alternately, only the coupler unit on the fluid receiving side (that is closest to the supply source) will have an actuatable valve closure.

Referring now to FIG. 3 a laterally projecting electrode plate 90 is shown fixed to the lower block 38 to establish electrical conductive relation therewith. Electrode plate 90 is shown apertured at 92 for electrical connection of a power cable 94 which connects station 10 to an arc welding power source E. Thus lower end of block 38 is rendered live when switch 18 is closed and so that the power source E is electrically connected via power cable 94 electrode plate 90, block 38, terminal post 74, and hose coupler 110 to the conductor buried within the wall of the gun water drainage hose 24. As aforedescribed, the conductors of the sheath of the water drainage hose 24 is grounded to the metal portion of the welding gun 10 and thereby the consumable wire electrode M which projects from the current tip 16 as is conventional.

As previously mentioned the inner body 34 of the utility supply station 10 is enclosed by a cylindrically shaped protective sheath or tube 100 whose inside diameter approximates the inside diameter of the upper and lower end blocks 36, 38 of the inner body so that it is snuggly but removably assembled therewith. It is held in place by headed bolt 102 which threadably connects into internally threaded hole 104 in the upper bolck 36 of said inner body 34. As shown best in FIG. 2 sheath 100 has a slot 106 in a wall thereof opposite tube 40, said slot having a slotted area 106a of reduced width adjacent its lower end through which projects the electrode plate 90. It also has a vertically narrow but horizontal wide section 106b with rounded ends which accomodate side-by-side location of the water outlet hose 66, gas hose 86 and water drainage hose 76 leading from the lower end block 38 to the respective sources W, G and D. It also has a substantially large or intermediate section 106c which provides access by the operator to the fixtures 62, 72, 82 as for tightening and loosening of the hose couplers thereto as may be required as well as general access to the interior of the station 10.

Advantageously, the supply hoses 66, 76, 86 need be only long enough to accomodate extension through slot 106 and coupling to the outlet hoses from sources D, G, and W. Also, couplers on the ends of said short length hoses which connect the station to the outlets of the supply sources may be sized differently to connect only to the correct outlet. They also may be color teamed for instant recognition as to which utility hose connects to which outlet. The end couplers of water hose 22 and drainage hose 24 of the gun as well as the corresponding short length supply hoses 66, 76 may be so designed that the water inlet hose 66 of, for example, the station 10 when disconnected from its outlet to W may be temporarily connected to the end coupler of the station water discharge hose 76 to prevent water leakage from the station. Similarly, the couplers affixed to the ends of the welding gun inlet hose 22 and water drainage hose 24 which connect to the station may be designed so that they also releasably connect with each other when detached from the station to confine water content in the welding gun and prevent leakage.

Also as illustrated by FIG. 5 the periphery of the lower end block 38 may be notched as at 130 to provide for passage of the switch cable 32 (FIG. 1) so that it is held out of the operator's way. This, however, is optional and will depend on where the outlet for the switch control circuit of the welding gun is located.

Furthermore a boot 140 (FIG. 1) may be provided to enclose the exposed lower end block 38 of the station 10 and the couplers of the gun hoses there. As shown in said FIG. 1, the boot 140 may be removably clamped as by clamp 142 about the lower end of outer sheath 100. Thus, by loosening clamp 142 and removing screw 102, sheath 100 and boot 140 may be separated to expose the lower block 38 to permit disconnection of the gun hoses from the station as when necessary to repair or replace gun 12. The vertical length of slot 106 and its horizontal width in sheath 100 is sufficient to permit such without having to disconnect short length hoses 66, 76, 86 from outlets W, D and G, respectively.

Thus it will be seen that all of the recited objects advantages and features of the invention have been demonstrated as obtainable in a simple and convenient structure and one which facilitates the selective disabling or deactivating of the welding gun and/or the station by the operator and in the immediate work area, quickly and safely.

Thus having described the invention what is claimed is:

1. A welding gun utilities station through which a welding gun is connected to utilities such as welding voltage, arc shielding gas and cooling fluid, said station comprising an inner body and an enclosing sleeve of insulative material, said inner body embodying spaced upper and lower block portions and an axially offset tubular portion between said block portions defining a passageway through which a consumable wire electrode feeds; the lower end of said tubular portion being adapted for connection to an electrode receiving casing which leads to the welding gun, at least the lower block portion being of electrically conductive metal and containing spaced ports to the lower ends of which a gas hose, a cooling fluid hose and a fluid drainage hose leading to the welding gun are respectively connected, said sleeve of insulative material having an access slot through the wall thereof opposite said tubular portion of the inner body and extending between said upper and lower block portions of said inner body, and short length hoses each having one end connected to the upper end of each said ports, said short length hoses extending outwardly of the sleeve through the access slot thereof, and coupler means at the opposite end of each said short length hoses by which said short length hoses are respectively connected to outlets of a gas supply, a cooling fluid supply and to drainage, each said coupler means including normally closed valve means which is opened by its connection of the short length hoses to said outlets.

2. A welding gun utilities supply station as claimed in claim 1 wherein the body contains a recess for supporting an insulated electrical conductor which connects a welding gun switch control to a source of electrical power.

3. A welding gun utilities supply station as claimed in claim 1 where an electrically insulative boot is releasably clamped about the lower end of the electrically conductive metal lower block portion and its enclosing sheath to removably shield the connections of the welding gun hoses and electrode receiving casing thereto.

4. A welding gun utilities supply station as claimed in claim 1 wherein the gun utility hoses are connected to the inner body of the station by quick connect-disconnect couplers.

5. A welding gun utilities supply station as claimed in claim 4 wherein the quick connect-disconnect couplers include normally closed valves which are opened to the gun when the gun hoses are connected to the station.

6. In combination with a welding gun to which utilities such as gas, water and electricity are connected, a utility station through which the gun is connected to sources of said utilities, said station including an inner body having spaced upper and lower blocks and an intermediately disposed axially offset tube through which a consumableelectrode is fed from a supply source to a casing leading from the lower block to the welding gun, at least the lower block being of electrically conductive metal, and a sleeve of insulative material enclosing said inner body and having an access slot through the wall thereof opposite said tube, said slot being disposed intermediate the upper and lower blocks of said inner body, and the inner body having spaced openings through its lower block to the lower end of which a gas hose, a water supply hose and a water drainage hose from the welding gun are respectively connected, said station further including short length hoses each having one end connected the upper end of to a respective one of said openings of the lower block, said short length hoses extending outwardly of the sleeve through said slot therein and each having couplers at their opposite ends by which the short length hose thus connecyed to the welding gun gas hose may be readily detachably connected to a supply of gas, the short length hose connected to the welding gun water inlet hose may be connected to a supply of water and the short length hose connected to the welding gun water drainage hose may be readily detachably connected to drainage, and the lower block of the station having an electrode plate, which detachably conntects to a source of electrical power, the water drainage hose containing a cable which is electrically connected to the welding gun and to the lower block of the inner body of the station.

7. The structure of claim 6 wherein the gun hoses through which gas, water inlet and drainage lead to the gun are connected to the inner body of the station by quick connect-disconnect couplers, said couplers including a normally closed valve which is opened by the connection of the couplers.

8. The structure of claim 6 wherein the lower block of the inner body further contains a recess through which an insulated electrical connector for connecting a welding gun control switch to a source of electrical power is supportingly located.

9. The structure of claim 8 wherein a flexible boot of insulative material is releasably clamped about the lower end of the sleeve and encloses the connections of the gas, water supply and water drainage hoses to the lower block of the station inner body.

* * * * *